Feb. 27, 1968   B. L. LEWIS   3,371,345
RADAR AUGMENTOR
Filed May 26, 1966
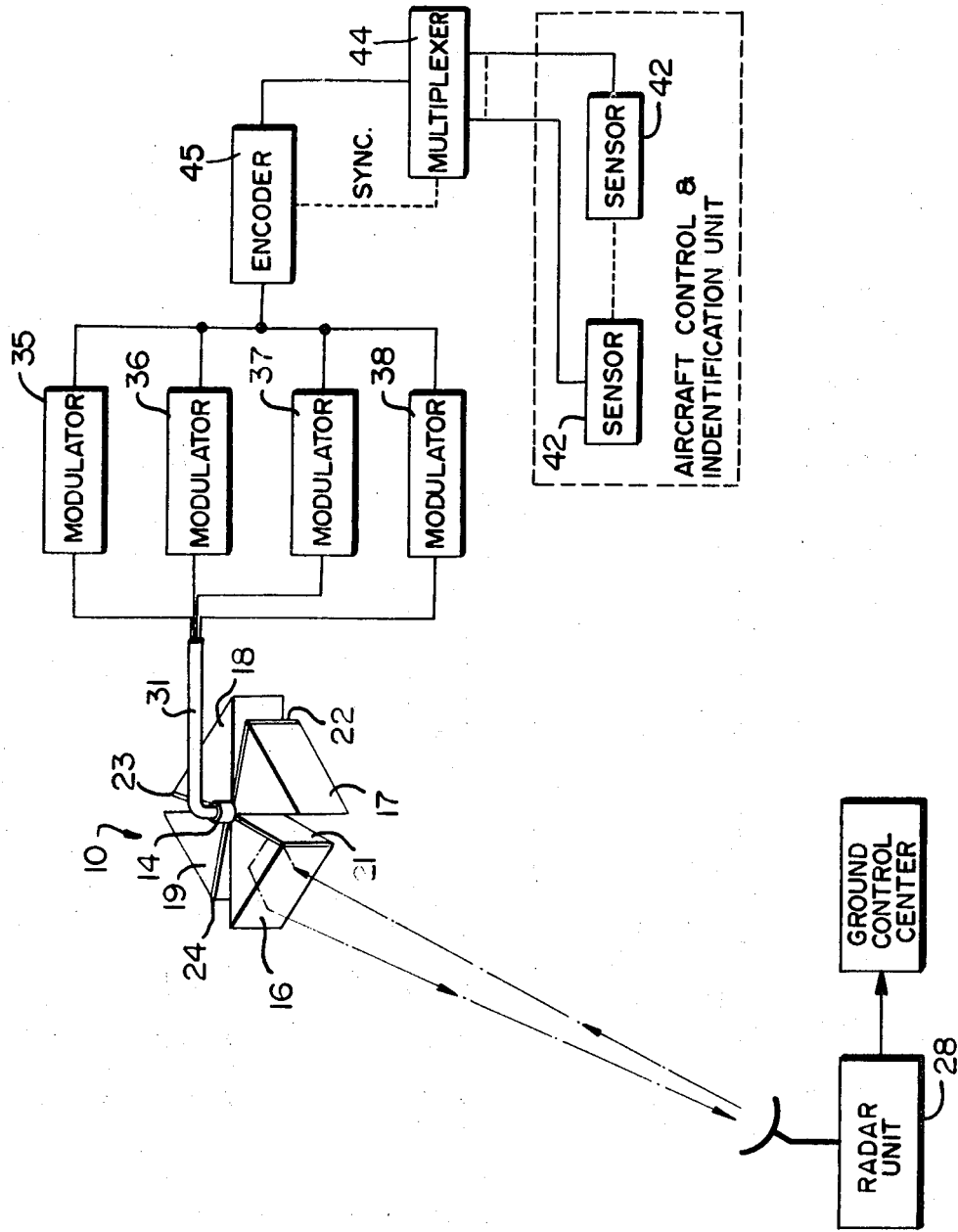
INVENTOR
BERNARD L. LEWIS
BY *Hurvitz & Rose*
ATTORNEYS United States Patent Office 3,371,345
Patented Feb. 27, 1968

3,371,345
RADAR AUGMENTOR
Bernard L. Lewis, Satellite Beach, Fla., assignor to Radiation Incorporated, Melbourne, Fla., a corporation of Florida
Filed May 26, 1966, Ser. No. 553,130
3 Claims. (Cl. 343—18)

ABSTRACT OF THE DISCLOSURE

An array of retrodirective corner reflectors mounted on an aircraft, each reflector being modulated at a different modulating frequency on which coded information is impressed. Modulation is accomplished by providing an ionizable gas filled tube adjacent one of the reflecting surfaces of each reflector and applying ionizing voltages to the tube in accordance with the information to be transmitted. The reflection coefficients of the reflectors are varied in accordance with the state of ionization of the gas.

---

The present invention relates generally to radar augmentors for aircraft control and identification, and more particularly to a form of radar beacon system wherein the return signal from an aircaft to a ground based radar is modulated by desired information by appropriately modulating the reflection coefficient of retrodirective reflectors mounted on the aircraft.

As is well known, the conventional radar beacon system includes both an interrogating transmitter for directing interrogating pulses to a relatively moving target and a transponder system located on the target for responding to the received pulses by initiating a series of coded pulses containing the information desired by the interrogating station. Such a system, of course, differs from the conventional radar system primarily in that the target is active rather than passive, i.e., the return signal is radiated from a target-mounted transmitter instead of constituting merely a target reflection.

The coded reply pulses from the transponder on board the aircraft may include such information as identity, speed, and altitude of the target, the air-traffic control center having prime responsibility for control of the aircraft, flight initiation and termination points, as well as a variety of other items of information, all of which is supplied from appropriate sensors and/or pre-recorded systems, encoded and modulated on the reply frequency in a well known manner. Beacon systems are quite advantageous in some respects; for example, since the target signal is transmitted directly from the aircraft, it is not subject to the degree of attenuation nor to the fluctuation inherent in the typical radar backscatter signal. Moreover, the reply signal is readily distinguished from ground clutter and other interfering phenomena by appropriate encoding and by use of reply frequencies differing from the interrogation frequency, not available in the case of pure radar backscatter. However, the beacon system is not without disadvantages, primary among which are the relative system complexity and cost, the likelihood of interference from other beacons, particularly in areas of high traffic density, the requirement of an active transponder; and the frequency sensitivity, possibility of detuning, lack of omnidirectional coverage, requirement of significant power and the operational necessity of multiple antennas, in the transponder portion of the system aboard the aircraft.

The present invention retains many of the advantages of a radar beacon system, while eliminating or reducing several of the disadvantages accompanying the beacon operation. More specifically, the invention provides a coded radar augmentor for air traffic control and aircraft identification, in the form of an array of modulatable retrodirective corner reflectors mounted on the aircraft, each corner modulated by a different subcarrier frequency on which the reply information is impressed to eliminate interference at the ground control radar unit between simultaneous replies or returns (i.e., reflected signals containing the encoded information) from two or more of the corners. The return signal to the radar site is then simply a reflection of the carrier wave, originally transmitted in unmodulated form from that site, on which the interference-eliminating frequencies containing the encoded information are modulated by appropriate variation of the reflection coefficient of the corner reflectors on which the carrier wave is incident.

Embodiments of suitable modulatable corner reflectors for use in the radar augmentor system of the present invention are described in detail in my co-pending application Ser. No. 539,078, filed Mar. 31, 1966, now Patent No. 3,308,464, and in the co-pending application of Lewis et al., Ser. No. 542,063, filed Apr. 12, 1966, both of those applications being commonly assigned herewith. Briefly, the modulatable corner reflector disclosed in the first-mentioned application is constructed of a dielectric material in the shape of a polyhedron such as a dihedral, trihedral or square reflective corner. The dielectric constant of the material is preselected to produce retrodirective reflection of an electro magnetic wave incident on the corner, at an angle of reflection equal in both sign and magnitude to the angle of incidence. This is accomplished by total internal reflection at interfaces between the dielectric of which the corner is composed and the medium in which the corner is used; in this case, air. Modulated retrodirective reflectivity is achieved by depositing or otherwise attaching (e.g., by printed circuit techniques) an interconnected array of electrical components, each having at least one voltage variable parameter, onto one of the reflecting faces of the corner; and driving or exciting these components with a modulating signal applied via a pair of conductors to which the component array is connected. Varying the voltages applied to the input conductors produces a corresponding variation in the voltage variable parameter of the deposited array of components, and accordingly. in the R-F reflection coefficient of the dielectric-air interface. Hence, modulated specular reflection of the incident carrier wave is achieved by which the control or identification information is transmitted to the ground control radar.

The modulatable corner reflector disclosed in the aforementioned Lewis et al. application, also suitable for use in the coded radar augmentor of the present invention, comprises a solid dielectric polyhedral corner reflector and, like the earlier mentioned corner reflector, is capable of providing extended coverage for retrodirective reflection of electromagnetic waves incident at angles up to ±90 degrees with respect to the axis of symmetry of the reflector. Phase modulation of the reflected signal is achieved by provision of an ionizable gas-filled tube adjacent to and in contact with a reflecting face of the corner, and application of ionizing voltages to the tube electrodes in accordance with the information to be transmitted. Amplitude modulation of the reflected signal is accomplished by spacing the gas-filled tube a small fraction of a wave length (e.g., up to approximately 0.175λ) away from the reflecting face of the corner and thereafter modifying the reflection coefficient of the corner by varying the state of ionization of the gas with the modulating voltages.

According to the present invention an array of such modulatable extended coverage retrodirective corner reflectors, for example three or four, is mounted on the aircraft and each reflector fed by a different modulating frequency on which the coded information is impressed.

It will be observed that the invention provides a passive unit aboard the aircraft, in contrast to the active transponder normally employed. Among the other advantages of such a system are substantial elimination of several of the aforementioned problems asociated with transponders, complete angular coverage, light weight, low power drain, ease of modulation, elimination of time delay in the reply, greater reliability, capability of broadband operation (i.e., operation at any frequency above that whose wavelength is on the order of the corner aperture, so that the device is essentially frequency indepndent), and large equivalent scattering cross-section.

Accordingly, it is a principal object of the present invention to provide a radar beacon system wherein a passive unit is employed aboard the aircraft for impressing the desired air-traffic control and identification information on a carrier transmitted by the ground control radar.

It is another object of the invention to provide an improved radar augmentor for control and identification of cooperating aircraft.

Still another object of the invention is to provide an aircraft traffic control and identification system for augmenting ground control radar systems, wherein an array of modulatable retrodirective corner reflectors is mounted on the aircraft, each reflector modulated by a different subcarrier upon which the control and identification information is impressed.

The above and still further objects, features and attendant advantages of the invention will become apparent from a consideration of the following detailed description of a preferred embodiment thereof, especially when taken in conjunction with the accompanying drawing, in which the sole figure depicts a preferred embodiment of the coded radar augmentor system.

Referring to the drawing, an array 10 of modulatable corner reflectors, four in this example although the number may vary as desired, is mounted on the aircraft (not shown) by means of a suitable support structure 14, which may take any conventional form. Each of the modulatable corner reflectors 16, 17, 18, 19 may be of the type disclosed in detail in the aforementioned Lewis et al. application, for example, wherein an ionizable gas is housed in transparent containers 21, 22, 23, 24 respectively, each adjacent a reflecting face of the associated corner reflector.

It will be understood that the ionized gas may be disposed in contact with the reflecting face if phase modulation of the reflected wave is desired, or spaced a small fraction of a wavelength of the incident wave (e.g., less than 0.175λ) from the reflecting face if amplitude modulation is desired. In any event, each of the ionizable gas containers is spaced a sufficient distance from the next adjacent corner to prevent modulation of waves incident on that corner. Since attenuation of any waves not undergoing total internal reflection is relatively rapid as the distance from the face penetrated increases, a separation of one or two wavelengths of the expected frequency of the carrier wave transmitted by the ground control radar unit 28 is sufficient.

The support structure 14 for the array 10 may carry a cable 31 through which a plurality of electrical conductors are connected to terminals of the gas containers for application of modulating voltages thereto. The latter voltages are derived from separate modulators 35, 36, 37, 38, each arranged to modulate the reflection coefficient of the corner reflector-ionizable gas interface at a distinct and different subcarrier frequency from that of the reflection coefficients of the other interfaces.

The various items of information relevant to traffic control, such as altitude and air speed, are obtained from sensing units 42 in the conventional sensor system for the aircraft, sometimes referred to as the pilot's control unit. Output voltages of the sensing units are multiplexed and applied in synchronous sequential fashion to an encoder 45 via multiplexer 44, and the encoder output voltages impressed on the subcarrier frequencies by the modulators 35–38, to which the latter voltages are applied in parallel.

In operation of the system, an unmodulated carrier wave transmitted by a ground control radar unit 28 and incident on one or more of the corner reflectors, such as 16, of array 10 is internally reflected from the interfaces of the corner in a manner described in detail in the copending Lewis et al. application. During this process, the carrier is modulated by the respective subcarrier or subcarriers, on which the coded information is impressed, by the variation in reflection coefficient of the dielectric-gas interface as the state of ionization of the gas is correspondingly varied by the modulating voltage. The modulated carrier is retrodirectively reflected back to the ground control radar unit, where the information is demodulated for transmission to and display at the ground air traffic control center in a conventional manner.

Since each corner reflector is capable of extended coverage, i.e. has a large equivalent scattering cross-section, up to ±90 degree angles of incidence relative to its axis of symmetry, the array 10 provides coverage for carrier waves emanating from any azimuthal quadrant about the aircraft. Interference between simultaneous returns from two or more corners at the ground control radar is eliminated by virtue of the different modulation frequencies for each corner reflector.

Details of the manner in which the array is supported for aerodynamic considerations and for protection have not been set forth because such factors are well within the skill of the art and will vary according to the designer, and further because such details are not within the essence of the invention.

While I have described and illustrated one specific embodiment of my invention, it will be clear that variation of the details of construction which are specifically illustrated and described may be resorted to without departing from the true spirit and scope of the invention as defined in the appended claims.

I claim:

1. A radar augmentor operable from directed interrogating carrier waves emanating from a location remote from the radar augmentor, comprising
    an omnidirectional array of retrodirective corner reflectors each of said corner reflectors being retrodirective in a different direction from the others and being modulatable in respect to its reflection coefficient in response to an electrical signal,
    a source of plural modulating signals of readily distinguishable frequencies,
    means for applying said modulating signals each to a different one of said corner reflectors in reflection coefficient modulating relation thereto,
    means operatively associated with said source of plural modulating signals for deriving items of information in the form of further electrical signals,
    means for impressing said further electrical signals concurrently on all said modulating signals,
    whereby each of said corner reflectors when irradiated by said interrogating carrier waves retrodirectively reflects said carrier waves modulated by one of said modulating signals on which has been impressed said further electrical signals, the frequencies of said modulating signals being sufficiently different that mutual interference thereamong is obviated.

2. The combination according to claim 1 wherein each of said corner reflectors comprises
a polyhedron composed of a mass of dielectric material having a preselected dielectric constant greater than that of the surrounding medium in which the reflector is to be utilized,
said polyhedron having a plurality of intersecting faces forming the corner from which incident R-F waves are to be reflected interiorly of said dielectric material; and
wherein said means for applying said modulating signals are disposed on respective ones of said intersecting faces.

3. The combination according to claim 2 wherein said means for applying said modulating signals comprise respective enclosures enclosing gaseous ionizable media, each of said media responsive to a different one of said modulating signals to change its state of ionization and thereby modulate said incident R-F waves.

References Cited

UNITED STATES PATENTS 2,432,984 12/1947 Budenbom.
3,543,130 2/1951 Robertson.
3,117,318 1/1964 Jenes.

FOREIGN PATENTS 1,107,300 5/1961 Germany.

RODNEY D. BENNETT, *Primary Examiner.*

B. L. RIBANDO, *Assistant Examiner.*